Feb. 8, 1966 F. LAA ETAL 3,233,706

BRAKE MECHANISM FOR PUSH BUTTON CONTROLLED TAPE RECORDERS AND RECORD PLAYERS

Original Filed July 8, 1959

3 Sheets-Sheet 1

INVENTORS
FRIEDRICH LAA
GOTTFRIED KARGL

BY Frank R. Jifari

AGENT

Feb. 8, 1966 F. LAA ETAL 3,233,706

BRAKE MECHANISM FOR PUSH BUTTON CONTROLLED
TAPE RECORDERS AND RECORD PLAYERS

Original Filed July 8, 1959 3 Sheets-Sheet 2

INVENTORS
FRIEDRICH LAA
GOTTFRIED KARGL

BY
Frank R. Jifani
AGENT

INVENTORS
FRIEDRICH LAA
GOTTFRIED KARGL
BY
Frank R. Jeifari
AGENT

United States Patent Office 3,233,706
Patented Feb. 8, 1966

3,233,706
BRAKE MECHANISM FOR PUSH BUTTON CONTROLLED TAPE RECORDERS AND RECORD PLAYERS

Friedrich Laa, Vienna, and Gottfried Kargl, Brunn am Gebirge, Austria, assignors to North American Philips Company, Inc., New York, N.Y., a corporation of Delaware Original application July 8, 1959, Ser. No. 825,718, now Patent No. 3,128,850, dated Apr. 14, 1964. Divided and this application Nov. 22, 1963, Ser. No. 325,538
Claims priority, application Austria, July 9, 1958, A 4,845/58
3 Claims. (Cl. 188—105)

The invention claimed herein is divided out of our copending application, Serial No. 825,718 filed July 8, 1959, now U.S. Patent 3,128,850.

This invention pertains to tape recorders and record players in which manual control of the several motions of the tape reel or spool, or turntable, is initiated by push button type controls, and more particularly to a single brake and brake operating linkage or mechanism, that is operated by a plurality of push buttons, one each for the separate motions required, which may be spatially located to a greater or lesser degree.

It is noted that positive braking action is required in tape recorders and record players, even though the driving mechanism is disengaged, to prevent drift of the spools or turntable.

Heretofore, a single pivoted lever type control has been widely utilized to start and stop a spool or turntable and to initiate clockwise or counterclockwise rotation of a tape recorder spool. Such a control can be easily constructed to start and stop movement of a spool or turntable since the brakes and a single associated linkage means can be easily controlled from a single location.

A single location or point of control is lost when a push button is used to control a single movement, where several movements, and thus several push buttons, are necessary. As a result it has been necessary heretofore to provide several separate brake controlling mechanisms associated with each push button or groups of neighboring push buttons. Obviously, while such duplication is costly per se, it also creates complications due to the minimal space allowances for such mechanisms, and results in excessive assembly and repair costs.

The above enumerated disadvantages of known push button controls for tape recorders and record players are overcome according to this invention by providing a single brake actuating linkage or mechanism to apply and release a brake, or in the case of tape recorders to apply and release a pair of brakes, one for each spool. The brake actuating linkage is controlled from a single lever or pawl element, or an equivalent like element, to which each of the push buttons is connected. Thus, the brakes are applied and/or released by each of the push buttons.

In one form of the invention a cantilevered member is utilized, in which the ends of the cantilever are connected to spatially located lever type push buttons hereinafter referred to as a key, or groups of such keys and a single brake linkage is connected intermediate the ends of the cantilever. When a key at one end of the cantilever is depressed the cantilever pivots about its other end to actuate the brake linkage, which releases the brakes previously applied. When this same key is returned to an inoperative position the brake linkage, constrained by a spring, or equivalent arrangement, returns to its initial position. In another form of the invention a rotatable torque bar arrangement, hereinafter referred to as a pawl is utilized in place of the cantilever or rocking lever described above. One end of the elongated pawl is connected to a brake linkage, or in a tape recorder where two brakes are utilized, one for each spool, a brake linkage is connected at each end of the pawl. Intermediate the ends of the pawl a plurality of separate push buttons are each connected to a pawl. In this arrangement a compact switch board (keys or push buttons) is provided in which each switch is independently operable on a single brake and brake actuating linkage.

In each of the forms of the invention briefly described above each switch, whether key or button type, is maintained depressed in any known suitable manner and may be released by depressing a separate switch operating as an overcontrolling release switch. Also, the switches are temporarily movable, in a manner known per se, beyond their on-position whereby the brakes are applied to arrest the turntable or tape spools.

The invention will be described in connection with tape or wire recorders for the sake of clarity and conciseness; the teachings of the invention being readily adapted to record players by those skilled in the art.

The above described objects and advantages, and additional advantages and objects will be described in connection with the appended drawings illustrating presently preferred embodiments of the invention in which.

For the sake of clearness only those constructional parts are shown which are relevant to the invention or require a particular design in connection therewith.

Figures 1, 2:
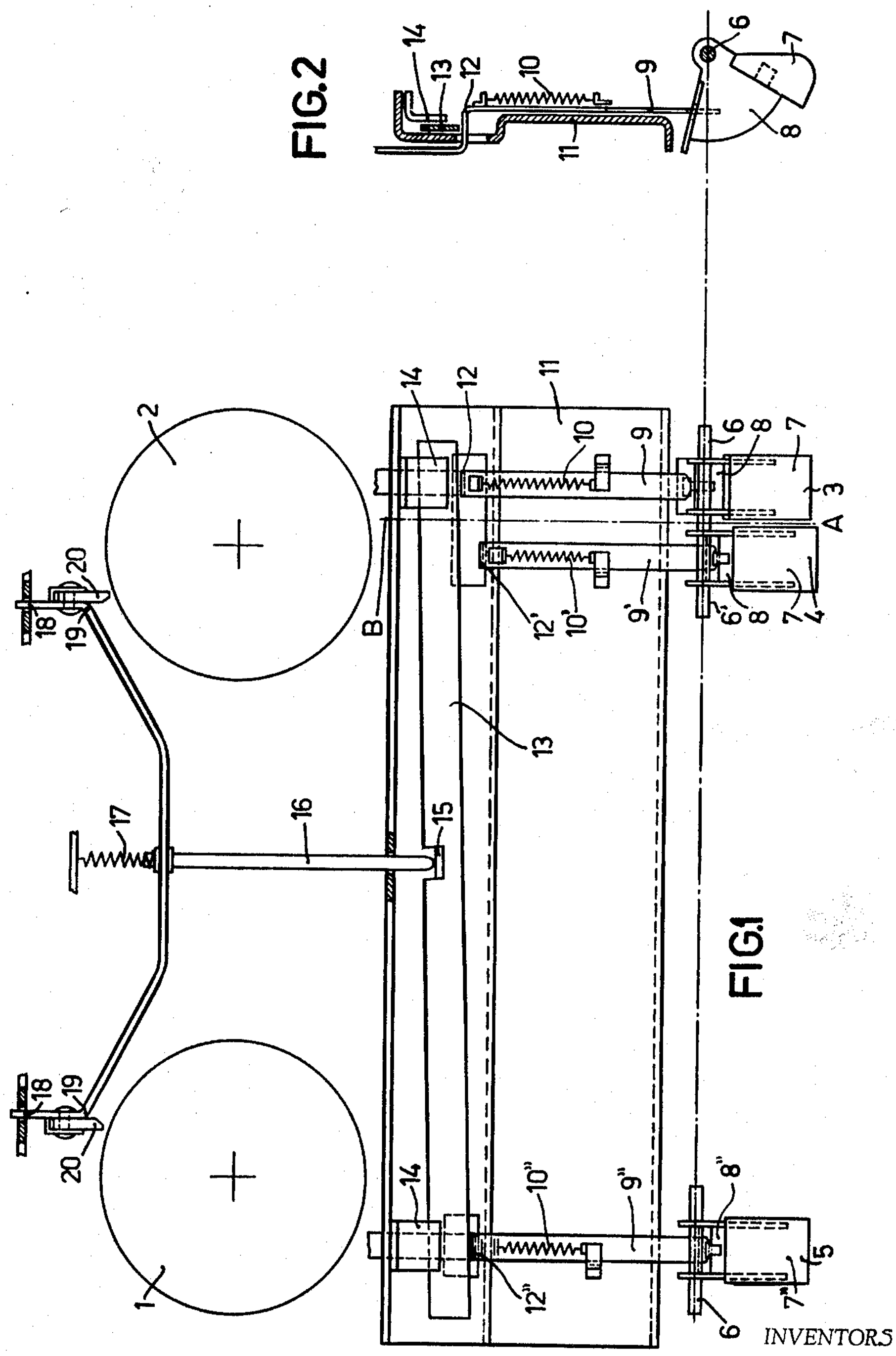
FIGURE 1 is a plan view of a device according to the invention for use in a tape recorder.
FIGURE 2 is a cross-sectional view of a detail of FIGURE 1.

The device shown in FIGURES 1 and 2 comprises spools or tape holders 1 and 2. Since the spools have to perform three movements, namely a movement at normal speed for recording and reproducing, a fast forward movement and a fast return movement, provision is made of three separate switches 3, 4 and 5 for starting and stopping these movements. These switches are pivotal keys, connected with levers (8, 8′, 8″) which turn about pivots (6, 6′, 6″) to shift rods (9, 9′, 9″) when keys (7, 7′, 7″), are depressed. The rods (9, 9′, 9″) are coupled to the keys by springs (10, 10′, 10″) which urge rods (9, 9′, 9″) downwardly as seen in the FIGS. 1 and 2, and the rods are movably supported on a part 11 of the frame. The bearing of the pivots (6, 6′, 6″) and the mechanical means determining the two end-positions of the key are not shown in FIGURES 1 and 2. Neither is it shown in FIGURES 1 and 2 how, by depressing the keys, either through levers 8 or through rods 9, the switching position of the complete driving mechanism required for the selected movement is reached since any suitable known arrangement may be used such as hereinafter described in connection with FIGURES 3 to 6.

The rods 9 are bent as shown to provide supporting surfaces (12, 12′, 12″) which extend in a plane normal to the plane in which the rods move and are in alignment when the keys are all in the initial position. Rested on these supporting surfaces 12 is a lever 13, namely with one end on the supporting surfaces 12 and 12′ of the right-hand group of keys, and with its other end on the supporting surface 12″ of the separate left-hand key. This lever 13 is supported in a floating or rocking manner between the partial frame 11 and guide members 14. At the middle of the lever provision is made of a recess 15 into which the bar 16 is pressed by a spring 17 so that the ends of the lever 13 are held against the supporting surfaces 12 of the rods 9. The bar 16 is guided at several points at 18 so as to be movable only in a direction at right angles to the lever 13. Arms 19 of the rod, which extend to both sides, actuate brakes 20 which apply at the periphery of tape-holders 1 and 2 as long as the keys 3, 4 and 5 and consequently also the lever 13 are in the rest position.

When depressing one of the keys 3, 4, or 5 for a given movement of the record carrier or spools, the lever 13 turns about the end remote from the depressed key and the brakes 20 are released through bars 16, 19. On termination of the movement of the spools 1, 2 by causing the key to reassume its initial position the brakes are urged to applied position by spring 17.

In the drawing, the key 3 of the device has been depressed. Of course, it is insignificant which key is depressed for actuating the brake bars. The lever 13 coordinates the switches (keys 3, 4, 5) operating separately for switching on the movements and concentrates their effects, so far as regards the brakes, at a single location, namely the recess 15.

In the FIGURES 1 and 2 it is seen that the operation of the lever 13 is entirely independent of a particular construction of the switches 3, 4, 5 and associated members 6, 8, 9, 10 and 12. Thus, the position of lever 13, in brake release or brake on position, is determined each time an individual switch is operated. For the switches it is not absolutely necessary to use keys, since tumbler switches, other lever switches, rotary switches or the like may be used as well.

Linking of the lever 13 to the movable part of the switches, which determines the operative position of the lever, need not be effected by means of rods 9 and associated springs, since this may equally well be effected by articulated joints.

It may be desirable to be able to brake the spools for a short time without having to return the relative switch (key) to its rest position. In this case, it is advantageous to use switches or keys which are temporarily movable beyond their on-position. In the case of pivoted switches or keys (FIGURE 2) the levers or pawls 8 can easily be constructed in known manner (not shown) such that upon rotation beyond the on-position proper, the movement of the rod 9 occurs in a reverse manner so that the brakes again apply.

Figure 4:
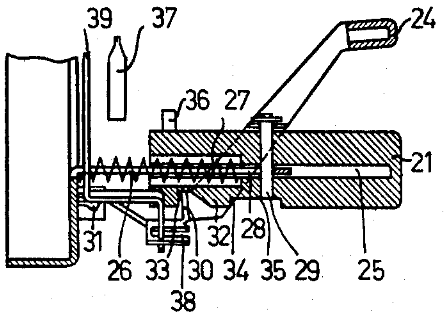
FIGURES 4 and 6 show push buttons of the construction shown in FIG. 3 in sectional view and, in particular, in their rest position (FIG. 4), in the normal working position (FIG. 6), and in FIG. 5 a modified push button is illustrated which may be pressed beyond the normal operation for the purpose fully explained hereinafter.
Figure 5:
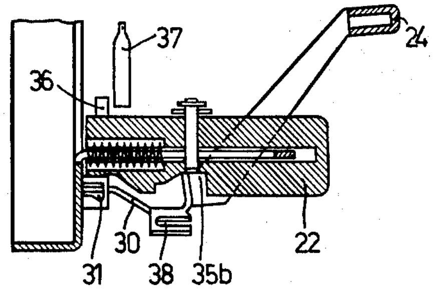
Figure 6:
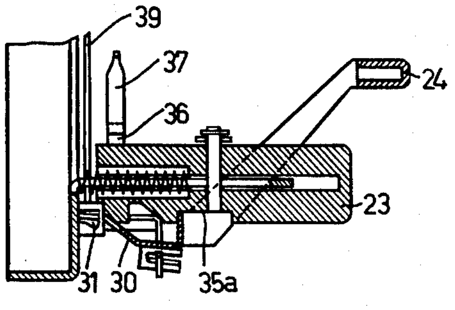

In a particularly simple device, the rod 9 and the lever 13 are directly coupled through a spring to a shaped surface, such as shown in FIGURES 4 to 6, which may be on levers (8, 8′, 8″) or cam permitting the floating lever to reassume its initial position when moving the switch beyond its on-position.

Figure 3:
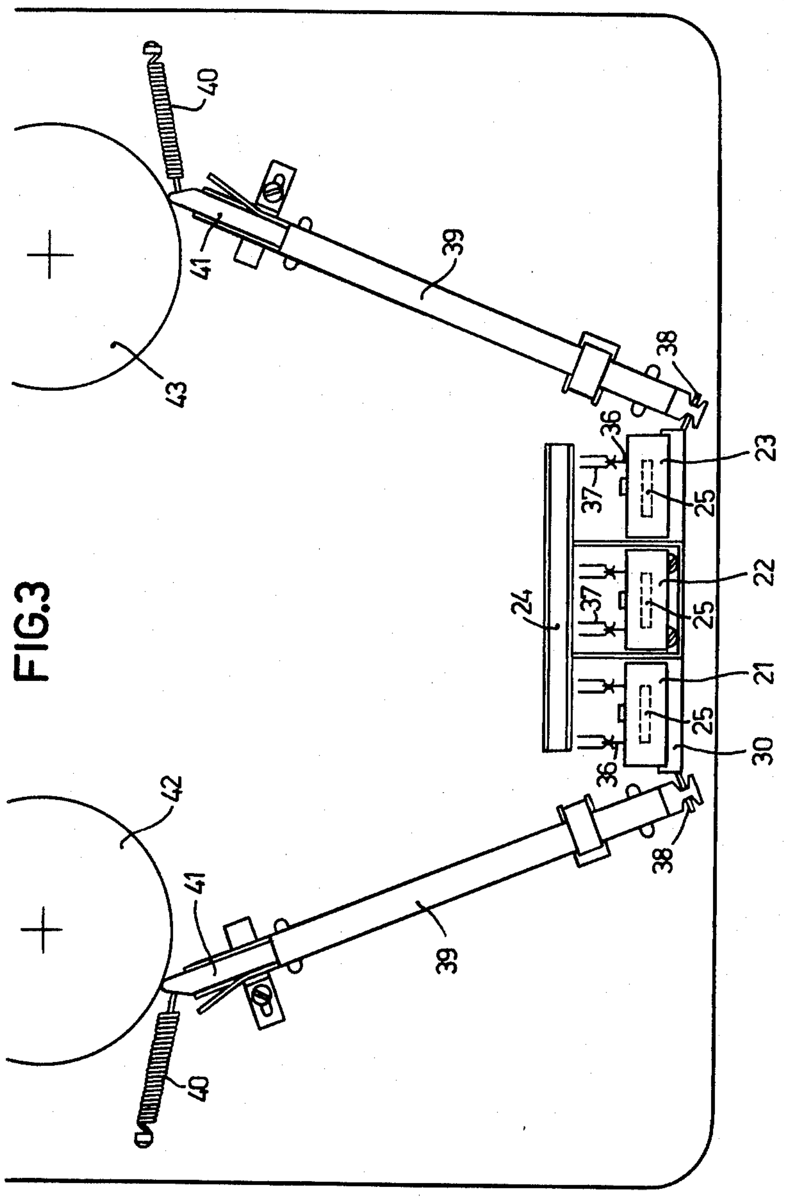
FIGURE 3 is a plan view of an arrangement, in which the switches or push buttons are united to form a switch board.

FIGS. 3, 4 and 6 represent a construction in which the individual switches, push buttons in this case, initiating each type of motion, are constructionally located to form a key aggregate or switch board. The three buttons for switching the types of operation are designated 21, 22 and 23. The button bodies of insulating material (best seen in FIGS. 4, 6) are provided with central recesses 25 permitting the bodies to be fitted to their supports 26 which serve to receive springs 27 urging the buttons outwardly. The button supports 26 are provided with a slot 28 for the passage of a pin 29 extending through the button body, by which pin and slot the outward movement of the button is limited. All the buttons are connected to a pawl 30 which is mounted for rotation about its longitudinal axis in bearings 31. One end of the pawl 30 engages a profiled or cam surface 32 constituted by a surface of the button bodies, and permitting the buttons to be locked in two different positions (33, 34) as a result of the cam shape. Moreover, the cam surface is shaped so that the button can be depressed beyond the on-position (seen in FIG. 6) to open contacts 36, 37 (as illustrated in FIG. 5). The off and on positions are respectively shoulders 33, 34 in the cam surface as seen in FIG. 4. The cam depths are so chosen that the pawl 30 in the off-position of the button (FIG. 4) and in its depressed or on-position (FIG. 6), has different rotational positions. In the on or depressed position of the button, the pawl is rotated to release the brakes by the button cam. The recess 35*a*, FIG. 6, in which the pawl slides beyond the shoulder 34 on fully depressing the button may be such, according to the purpose aimed at, that the normal operational position of the pawl (FIG. 6) subsequently occupies the same operational position as occupied in the rest state, or brakes-on-position (FIG. 5, 35*b*). Thus, in the arrangement of FIGS. 4 and 6 the button may be depressed beyond operating position to open contacts 36, 37 whereas in the modification of FIG. 5 the brakes are also applied.

The insulating button bodies contain knife-shaped electric contact pieces 36 by means of which electric contact pairs 37 are closed in the working position of the buttons, thus operating the electric control of the driving mechanism according to the type of operation chosen. The control mechanism is not shown in the drawing but its presence is indicated by a few contact pairs 37.

The pawl 30 carries at each of its ends a hook-shaped part 38 to which the pull-rods 39, constrained by springs 40, are connected. In this manner, the pawl 30 is permanently coupled to the contact or cam surface 32. Secured to the pull-rods 39 are brakes 41 acting on the two spools 42 and 43 as long as all the buttons are in the rest position. If one of the buttons is depressed, the pawl occupies its second conditional position so that the brakes are released. The brakes again apply when causing the button to resume its rest position, but the brakes may also be caused to apply by depressing a button having a cam path 35*b* beyond its working position, the degree of influencing the condition of the drive of the sound carrier or spools depending on the circumstances. Variation is possible by a corresponding construction of the contact members 36.

It will be apparent to those skilled in the art that each button may have identical or dissimilar though suitable cam surfaces or pawl notches. In the drawing the cam surfaces are illustrated as depressions or recesses of greater or lesser depth (pawl notches) in the button body proper, separated by the shoulder 34. As illustrated in FIG. 5 a composite pawl notch within which the pawl 30 resides, has a brake "off" surface adjacent the shoulder 34 and a brake applied surface 35*b* in order that the button 22 may be fully depressed to manually control operation by separating the contacts 36, 37 and applying the brakes.

FIG. 3 relates, for example, to a device in which the buttons 21 and 23 permit a fast backward movement and a fast forward movement of the sound-carrier by coupling the spools accordingly to the driving mechanism. The button 22 controls the rubber pressure roller (not shown) permitting the sound-carrier to be coupled to the driving shaft. If, consequently, the button 22 is depressed, the electric control for the rubber pressure roller is operated, since the contacts 36 and 37 become operative (FIG. 6) the sound-carrier advances at normal speed. Deep depression of the button 22 results in the contact between the contact pieces 36 and 37 being broken (FIG. 5) and consequently also the drive of the sound-carrier. Hence, the button 22 also has the function of a so-called "fast-stop control." In order to actually arrest the sound carrier momentarily, it is not sufficient only to interrupt its drive, since it has also to be braked momentarily. This is effected by the arrangement shown in FIGS. 3 and 5, since a deep depression causes the pawl 30 to occupy the same operational position as in the initial position of the key, so that the brakes apply immediately.

The pawl 30 may also have connected to it a release member of its own, in the present case the lever 24. Apart from switching the buttons to neutral, lever 24 also permits release of the brakes without the sound-carrier being actuated by the driving mechanism of the apparatus. Since the brakes are released, the sound carrier is easily slightly movable by hand.

The invention is not limited to magnetic recorders using a tape or wire sound-carrier, since it also applies to devices in which a disk-shaped sound-carrier rests on a turntable.

What we claim is:

1. A brake mechanism for reproducing apparatus comprising: at least one member comprising a brake normally urged to brake applied position, brake control means comprising a floating lever normally urged to its brake applied position, means for urging said lever to its brake applied position; means intermediate the ends of said lever for operably linking said brake and said lever, a plurality of manually operable control means, and means operably connecting each said control means with said floating lever adjacent each said end thereof, said last mentioned means moving said brake control means to its brake release position upon actuation of a control member to its operative position; each operating control means includes a cam member to which said brake control member is coupled, said cam means having two surfaces both of which release said brake control member to its brake-on-position.

2. A brake mechanism for reproducing apparatus in which at least one brake is operably controlled by a plurality of manually operated control selectors, the improvement characterized by a brake control member, a brake linkage means coupled with said brake control member and said brake and a plurality of operating control means each of which is operatively connected with said brake control member whereby said brake control member is operable by each one of the said plurality of operating control means; said brake control member comprising a floating lever, said operating control means being connected with said lever adjacent each end thereof, and the brake linkage means is coupled with said lever intermediate the ends thereof, each operating control means includes a cam member to which said brake control member is coupled, said cam means having two surfaces both of which release said brake control member to its brake-on-position.

3. A brake mechanism for reproducing apparatus according to claim 2 wherein each said operating control means includes a cam member to which said brake control member is coupled, said cam means having two surfaces both of which release said brake control member to its brake-on-position.

References Cited by the Examiner

UNITED STATES PATENTS

| | | | |
|---|---|---|---|
| 150,620 | 5/1874 | Sanderson | 188—166 |
| 1,127,160 | 2/1915 | Baker | 74—479 |
| 1,203,658 | 11/1916 | Van der Sluys. | |
| 2,857,638 | 10/1958 | Ribeiro | 188—166 X |
| 2,923,380 | 2/1960 | Selstad et al. | 188—166 |

FOREIGN PATENTS

| | | |
|---|---|---|
| 959,881 | 3/1957 | Germany. |

MILTON BUCHLER, *Primary Examiner.*

DUANE A. REGER, ARTHUR L. LA POINT, *Examiners.*